(12) United States Patent
Goettfried et al.

(10) Patent No.: US 10,266,045 B2
(45) Date of Patent: Apr. 23, 2019

(54) BATTERY RETAINING DEVICE

(71) Applicant: MAGNA STEYR Fahrzeugtechnik AG & Co. KG, Graz (AT)

(72) Inventors: Dietmar Goettfried, Hausmannstätten (AT); Stefan Maier, Lavamuend (AT); Peter Nell, Graz (AT); Juergen Taucher, Sinabelkirchen (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 15/817,370

(22) Filed: Nov. 20, 2017

(65) Prior Publication Data

US 2018/0141424 A1    May 24, 2018

(30) Foreign Application Priority Data

Nov. 23, 2016   (EP) ..................... 16200192
Feb. 8, 2017    (EP) ..................... 17155163

(51) Int. Cl.
| | |
|---|---|
| *B60K 1/04*   | (2019.01) |
| *B60L 11/18*  | (2006.01) |
| *H01M 2/10*   | (2006.01) |
| *B62D 21/15*  | (2006.01) |
| *B62D 25/02*  | (2006.01) |

(52) U.S. Cl.
CPC ............ *B60K 1/04* (2013.01); *B60L 11/1877* (2013.01); *B62D 21/15* (2013.01); *B62D 21/157* (2013.01); *B62D 25/025* (2013.01); *H01M 2/1083* (2013.01); *B60K 2001/0438* (2013.01); *B60K 2001/0472* (2013.01); *B60Y 2306/01* (2013.01); *H01M 2220/20* (2013.01)

(58) Field of Classification Search
CPC ................................. B62D 21/15; B60K 1/04
See application file for complete search history.

(56) References Cited

U.S. PATENT DOCUMENTS

| | | | | |
|---|---|---|---|---|
| 5,555,950  | A  * | 9/1996  | Harada ..................... | B60K 1/04 |
|            |      |         |                            | 180/232   |
| 9,409,470  | B2 * | 8/2016  | Trentin .................... | B60K 1/04 |
| 10,005,350 | B1 * | 6/2018  | Khan ........................ | B60K 1/04 |
| 2009/0226806 | A1 | 9/2009 | Kiya |
| 2016/0288636 | A1 | 10/2016 | Kamimura et al. |

FOREIGN PATENT DOCUMENTS

| | | | |
|---|---|---|---|
| DE | 112007000474 | T5   | 1/2009 |
| DE | 102012108816 | A1   | 3/2013 |
| EP |      2562020 | A1   | 2/2013 |
| FR |      2994895 | A1 * | 3/2014 ............... B60K 1/04 |
| FR |      2994895 | A1   | 3/2014 |
| JP |     H07246845 | A    | 9/1995 |
| JP |    2015123801 | A    | 7/2015 |
| JP |       5930123 | B2   | 6/2016 |

* cited by examiner

*Primary Examiner* — James A Shriver, II
*Assistant Examiner* — James J Triggs
(74) *Attorney, Agent, or Firm* — Jordan IP Law, LLC; Todd A. Vaughn

(57) ABSTRACT

A battery holder arrangement for a vehicle that includes a battery and at least one bodywork component having at least one projection which acts as a catch for the battery. In a normal state of the vehicle, the battery is not held by the projection, and in a damaged state of the vehicle, the battery is held by the projection.

19 Claims, 2 Drawing Sheets

BATTERY RETAINING DEVICE

CROSS-REFERENCE TO RELATED APPLICATIONS

The present application claims priority under 35 U.S.C. § 119 to European Patent Application Nos. EP 16200192.9 (filed on Nov. 23, 2016) and EP17155163.3 (filed on Feb. 8, 2017), which are hereby incorporated by reference in their complete respective entireties.

TECHNICAL FIELD

Embodiments relate to a battery holder arrangement for a vehicle.

BACKGROUND

In particular in electric vehicles, such as, for example, an engine-electric hybrid vehicle, a PHEV and/or plug-in hybrid electric vehicle or an electric car, batteries which are larger than drive batteries are used, said batteries being able to comprise a large number of, for example, lithium-ion cells or nickel-hydrogen cells. Such batteries are typically large and heavy and, therefore, require a suitable arrangement and fastening to the vehicle.

Additionally, in the case of such high-voltage batteries, it has to be ensured that the battery, in particular a housing of the battery, is not crushed in the event of an impact of the vehicle, so that the battery cells are protected. It is known that such batteries may be screwed to the bodywork of the vehicle.

In the case of a side impact of a vehicle having a battery fastened in such a manner, however, such screw connections may fail and the battery may be displaced in an uncontrolled manner or may be entirely released from the vehicle.

German Patent Publication No. DE 10 2012 108 816 A1 discloses a battery supporting device for a vehicle which in the event of an accident permits a battery pack to be moved in a specific direction. The battery supporting device comprises the following: a battery pack which is formed by arranging a secondary battery in a housing and which is arranged in a lower region of a vehicle body; and a deformable support for supporting one end of the battery pack in the width direction of the vehicle, wherein as a reaction to an input load from the one end of the battery pack the deformable support is deformed in the vehicle width direction and, as a result, the other end of the battery pack is induced to move in the load input direction and to move downwardly relative to the vehicle bodywork.

SUMMARY

Embodiments relate to a battery holder arrangement for a vehicle which significantly increases the security of the battery and a vehicle equipped therewith in a cost-effective manner.

In accordance with embodiments, a battery holder arrangement for a vehicle comprises at least one bodywork component and a battery, the at least one bodywork component having at least one projection configured to act as a catch for the battery, so that in a normal state of the vehicle, the battery is not held by the projection, and in a damaged state of the vehicle the battery is held by the projection.

In accordance with embodiments, a vehicle battery, such as, for example, a drive battery, is held in a damaged state on a bodywork component of the vehicle, in particular, on a lateral sill or any other longitudinal structure of the vehicle, by a projection which in normal operation of the vehicle does not serve for fastening the battery. In the event of an accident, in particular, in the event of a lateral impact (e.g., an impact against a post), by utilizing the mechanical forces which are present in the event of the impact, the structural geometries are altered such that the projection and the battery come into contact with one another to such an extent that the battery is held by the projection at least in one spatial direction. Advantageously, this results in a positive connection between the battery and the vehicle shell and/or the bodywork, so that the battery is prevented from being released or detached from the vehicle. A battery pack which moves freely in the event of an accident/impact could otherwise represent a risk for other road users.

In accordance with embodiments, the bodywork component may, in particular, be a sill. The battery may, in particular, be a drive battery, i.e., a high-voltage battery comprising a plurality of cells as well as a battery housing. In accordance with embodiments, an electric battery is understood as the "battery," but the term may also encompass other energy sources which serve to deliver energy to a vehicle.

In accordance with embodiments, the bodywork component may integrally form the projection. The projection may also be fastened as an additional component to the bodywork component.

In a normal (i.e., undamaged) state of the vehicle, the battery is not held by the projection, and is also not brought into contact with the projection. In a damaged state of the vehicle, the battery is held by the projection and, therefore, also brought into contact with the projection.

In accordance with embodiments, the projection is configured vertically below the battery. Particularly, the projection forms a horizontally aligned holding plane so that in the damaged state, the battery is held by the projection counter to the force of gravity. The holding plane is thus aligned approximately parallel to the road and/or perpendicular to the Z-direction of the vehicle.

In the normal state, the battery may then be fastened to a fastening surface of the bodywork component, wherein the fastening surface may be aligned parallel to the holding plane of the projection. The fastening surface may be freely accessible from below for simple mounting of the battery by pushing in from below. The projection is, therefore, separated from the mounted battery by a free passage, i.e., a lateral spacing.

In accordance with embodiments, the projection forms one side of a holding recess. In the normal state, the battery is not held in the holding recess. In the damaged state, the battery is held in the holding recess. The holding recess has a three-sided boundary, with all three boundaries being configured from the bodywork component. One of the three boundaries of the holding recess may thus be the projection of the bodywork component. This boundary of the holding recess may thus be the horizontal holding plane. A further boundary of the holding recess which is parallel thereto may be the fastening surface or a surface which is an extension or a surface which is parallel to the fastening surface. The holding plane and the fastening surface may be increased by a lateral connecting surface relative to the holding recess.

In accordance with embodiments, the battery holder arrangement comprises a connecting member, such as, for example, a mechanical screw. In the normal state, the battery is fastened by the connecting member to the bodywork component. In the damaged state, the connecting member is deactivated, such as, for example, being broken, crushed, or opened, so that the battery and the projection and/or optionally the holding recess are moved toward one another so that the battery is subsequently held by the projection which acts as a catch.

In accordance with embodiments, in the normal state, the projection and/or optionally the holding recess are arranged on the outside of the vehicle relative to the battery, so that in the damaged state when the bodywork component is bent inwardly, i.e., closer to the vehicle longitudinal central axis, the projection and/or the entire holding recess moves from the outside closer to the battery in order to hold the battery.

In accordance with embodiments, the battery comprises a lateral support portion which in a damaged state of the vehicle is held by the projection. In the normal state, the lateral support portion is fastened via the connecting member to the bodywork component.

In accordance with embodiments, a vehicle may comprise a battery holder arrangement as described herein. The battery holder arrangement may be installed in the vehicle such that in the damaged state the projection secures the battery from being released and from dropping down.

DRAWINGS

Embodiments will be illustrated by way of example in the drawings and explained in the description below.

DESCRIPTION

Figure 1:
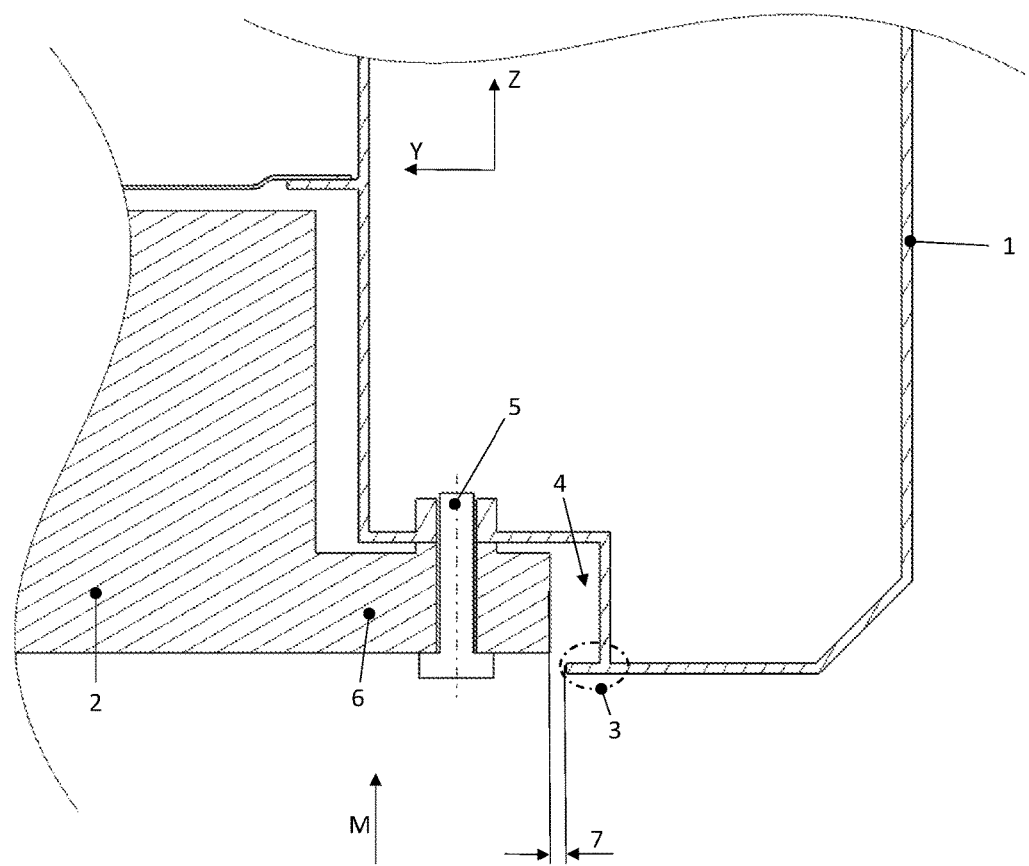
FIG. 1 is a sectional view of a battery holder arrangement in a normal state, in accordance with embodiments.
Figure 2:
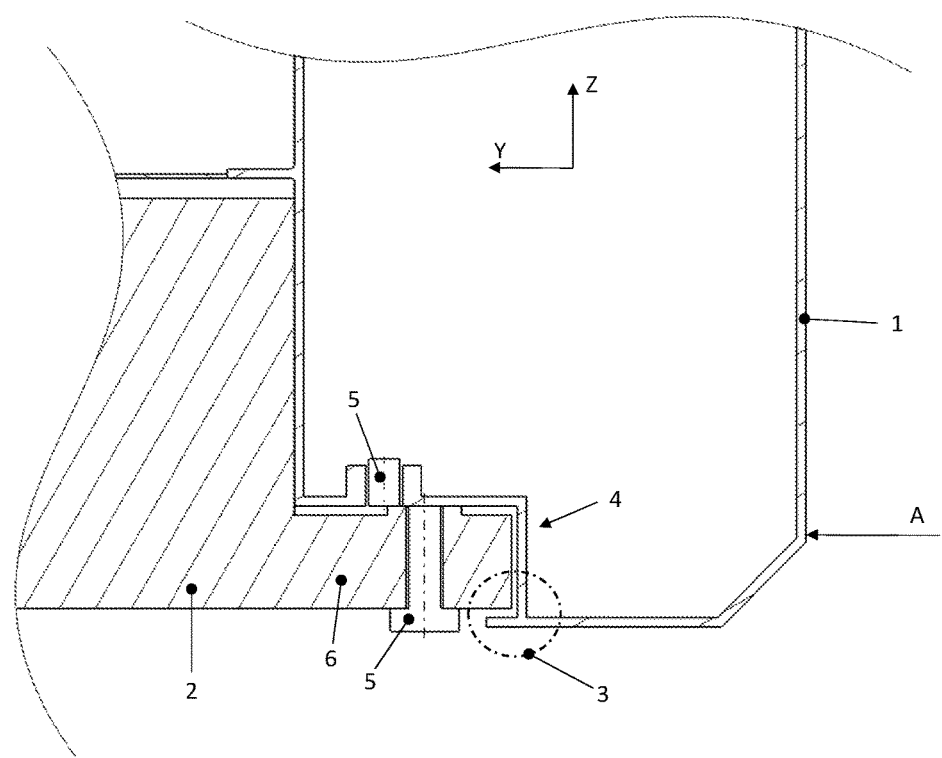
FIG. 2 is a sectional view of the battery holder arrangement of FIG. 1, in a damaged state.

As illustrated in FIGS. 1 and 2, a battery holder arrangement is provided. FIG. 1 illustrates, in a normal state, a catch 3 that does not hold a battery 2. FIG. 2 illustrates, in a damaged state, the catch 3 holds the battery 2 at the bottom in the direction of installation, so that the battery 2 does not drop down in spite of a connecting member 5 being ruptured.

The battery holder arrangement comprises a bodywork component 1, such as, for example, a lateral sill, and a battery 2, namely a drive battery in a battery housing. The bodywork component 1 comprises a projection 3 which is configured as a catch for the battery 2 so that in the normal state of the vehicle (FIG. 1), the battery 2 is not held by the projection 3. In the damaged state of the vehicle (FIG. 2), the battery 2 is held by the projection 3.

The projection 3 is configured vertically, i.e., in the Z-direction of the vehicle below the battery 2 and in the normal state is separated laterally by a free passage 7, in the form of a lateral spacing relative to the battery 2, whereby a simple mounting of the battery 2 is permitted in the mounting direction M, namely from below.

The projection 3 forms a horizontally aligned holding plane so that in the damaged state the battery 2 is held by the projection 3 counter to the force of gravity, so that the battery 2 is prevented from dropping in a downward direction. The projection 3 forms one side of a three-sided holding recess 4 which in the damaged state surrounds and holds a support portion 6 of the battery 2 which may be a portion of the battery housing of the battery 2, so that movements of the battery 2 in the downward, upward, and outward direction are prevented by a positive connection. In accordance with embodiments, all three sides of the holding recess are formed from the same bodywork component 1, for example, the sill.

The support portion 6 of the battery 2 is fastened in the normal state via the connecting member 5 to the bodywork component 1, in particular, to one side and/or an extension of the holding recess 4. In the case of a lateral impact of the vehicle, i.e., from outside, from the right in the figures shown, in the direction of impact A, the bodywork component 1 is forced inwardly, and thus, the bodywork component 1 and the projection 3 and/or the holding recess 4 are pushed closer to the battery 2. As a result, the connecting member 5, in particular, a screw, may be ruptured by the impact energy which is present and is thus deactivated as connecting member. As illustrated in FIG. 2, however, the battery 2 is in this case held by the projection 3 in spite of the rupture of the screw.

The term "coupled," or "attached," or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

List of Reference Symbols

1 Bodywork component
2 Battery
3 Projection
4 Holding recess
5 Connecting member
6 Support portion
7 Free passage
Z Z-direction, vertical
Y Y-direction, horizontal
M Mounting direction
A Impact direction

What is claimed is:

1. A battery holder arrangement for a vehicle, the battery holder arrangement comprising:
 a battery;
 at least one bodywork component having at least one projection which is configured such that in a normal state of the vehicle, the battery is not held by the at least one projection, and in a damaged state of the vehicle, the battery is held by the at least one projection; and
 a holding recess, wherein the at least one projection forms one side of the holding recess.

2. The battery holder arrangement of claim 1, wherein in the normal state of the vehicle, the battery is not held in the holding recess.

3. The battery holder arrangement of claim 1, wherein in the damaged state of the vehicle, the battery is held in the holding recess.

4. The battery holder arrangement of claim 1, wherein in the normal state of the vehicle, the at least one projection and/or the holding recess are arranged on an outside of the vehicle relative to the battery.

5. The battery holder arrangement of claim 4, wherein in the damaged state of the vehicle, the bodywork component is bent inwardly towards a longitudinal central axis of vehicle, the at least one projection, or the holding recess is moved from the outside of the vehicle in closer proximity to the battery.

6. The battery holder arrangement of claim 1, further comprising a connecting member configured such that in the normal state of the vehicle, the battery is fastened by the connecting member to the bodywork component.

7. The battery holder arrangement of claim 6, wherein in the damaged state of the vehicle, the connecting member is deactivated so that the battery and the at least one projection are moved toward one another.

8. The battery holder arrangement of claim 6, wherein the connecting member comprises a screw.

9. The battery holder arrangement of claim 1, wherein the projection is configured vertically below the battery and is configured to form a horizontally aligned holding plane so that in the damaged state of the vehicle, the battery is held by the at least one projection counter to a force of gravity.

10. The battery holder arrangement of claim 1, wherein the battery comprises a lateral support portion which, in the damaged state of the vehicle, is held by the at least one projection.

11. A vehicle, comprising:
a battery holder arrangement that includes:
  a battery;
  at least one bodywork component having at least one projection which is configured such that in a normal state of the vehicle, the battery is not held by the at least one projection, and in a damaged state of the vehicle, the battery is held by the at least one projection; and
  a holding recess, wherein the at least one projection forms one side of the holding recess.

12. The vehicle of claim 11, wherein:
in the normal state of the vehicle, the battery is not held in the holding recess; and
in the damaged state of the vehicle, the battery is held in the holding recess.

13. The vehicle of claim 11, wherein:
in the normal state of the vehicle, the at least one projection and the holding recess are arranged on an outside of the vehicle relative to the battery; and
in the damaged state of the vehicle, the bodywork component is bent inwardly towards a longitudinal central axis of vehicle, and the at least one projection and the holding recess is moved from the outside of the vehicle in closer proximity to the battery.

14. The vehicle of claim 11, further comprising a connecting member configured such that in the normal state of the vehicle, the battery is fastened by the connecting member to the bodywork component.

15. The vehicle of claim 14, wherein in the damaged state of the vehicle, the connecting member is deactivated so that the battery and the at least one projection, and the holding recess are moved toward one another.

16. The vehicle of claim 14, wherein the connecting member comprises a screw.

17. The vehicle of claim 11, wherein the at least one projection is configured vertically below the battery and is configured to form a horizontally aligned holding plane so that in the damaged state of the vehicle, the battery is held by the at least one projection counter to a force of gravity.

18. The vehicle of claim 11, wherein the battery comprises a lateral support portion which, in the damaged state of the vehicle, is held by the at least one projection.

19. A holder arrangement for a vehicle battery, the holder arrangement comprising:
at least one bodywork component having a projection which is configured such that in a normal state of the vehicle, the vehicle battery is not held by the projection, and in a damaged state of the vehicle, the vehicle battery is held by the projection; and
a holding recess, wherein the projection forms one side of the holding recess.

* * * * *